Oct. 1, 1935.                J. T. McNAMARA                2,016,252
                               SHUTTLECOCK
                            Filed March 7, 1935
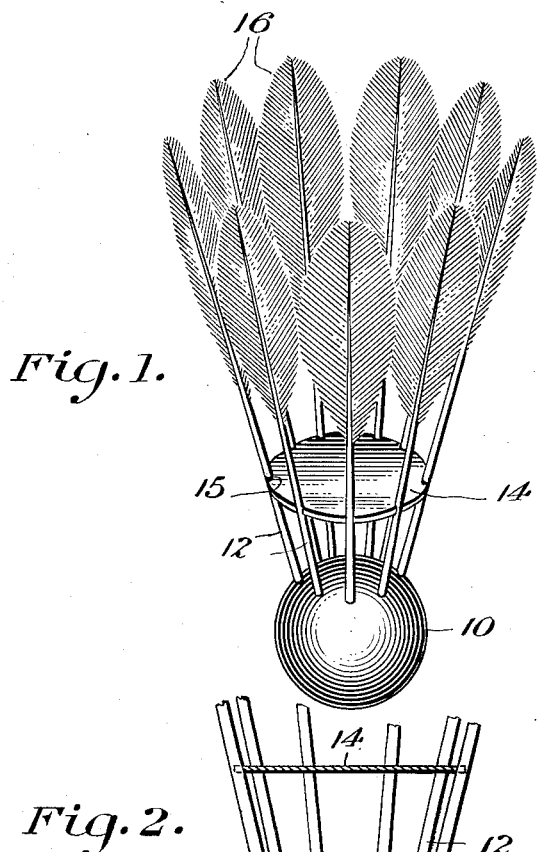
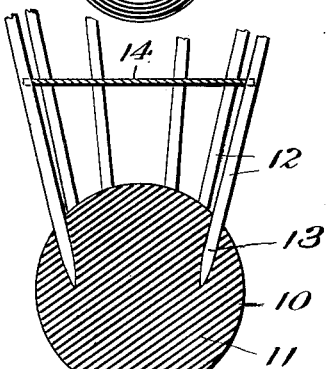
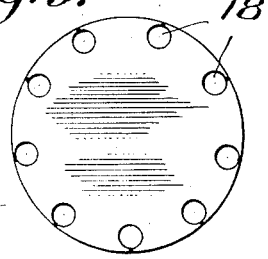
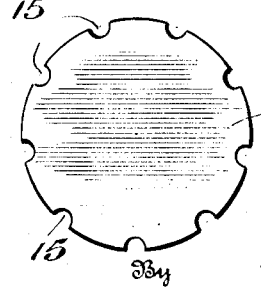
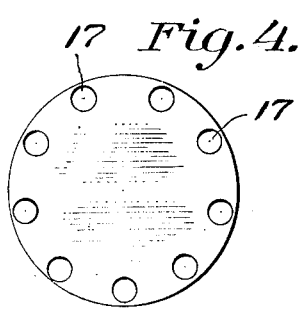
Inventor
John T. McNamara
By Edmund H. Parry Jr
Attorney Patented Oct. 1, 1935

2,016,252

UNITED STATES PATENT OFFICE 2,016,252

SHUTTLECOCK

John T. McNamara, Springfield, Mass., assignor to Milton Bradley Company, Springfield, Mass., a corporation of Massachusetts Application March 7, 1935, Serial No. 9,864

8 Claims. (Cl. 273—106)

This invention relates to improvements in shuttles or "birds" commonly used in games such as badminton, battledore and shuttlecock and the like. Such shuttles normally comprise a main body or head surmounted by flight guiding and retarding means usually taking the form of an assembly of feathered vanes, and are adapted to be propelled through the air from one player to another by a bat or racquet.

Shuttles must be light and possess a measure of liveliness to be satisfactory and at the same time must be strongly constituted in order to withstand the relatively hard treatment to which they are subjected in the course of play. The more successful devices now on the market involve elaborate detail and manifest painstaking care in construction in an effort to provide these combined characteristics which obviously reflect in their manufacturing cost and selling price.

The essential object of the present invention is to provide a shuttle of simplified construction having the desired attributes capable of being manufactured at a very reasonable cost.

In the attainment of such object a new form of head is provided possessing advantages over known types and the device embodies novelty in the arrangement of the guiding vanes and the manner of connecting the same with the head.

The nature and benefits of the improved shuttle will be understood by reference to the following description in conjunction with the accompanying drawing wherein:

Fig. 1 is a perspective view of one form of shuttle made according to the invention;

Fig. 2 is a part sectional view of the device of Fig. 1;

Fig. 3 is a view of the same reinforcing element shown in Fig. 1;

Figs. 4 and 5 are views of several other forms for the reinforcing element.

The head or striking part of the device comprises a body 10 molded of plastic material including a solid center or core 11. For lightness and resiliency the body 10 will preferably be composed of fine sponge rubber. The lightness and resiliency of the body can be varied according to the fineness of the rubber sponge employed. The rubber mass will be shaped in a vulcanizing mold according to the usual practice employed in making rubber balls and other similar articles. While the main body will be somewhat porous the molding operation will provide the body with a relatively smooth striking surface. In the form shown in the drawing the head 10 is shaped as a sphere, but it will be evident that the contour may be varied as desired.

By employing a molded head of plastic material I dispense with the necessity of providing a leather or other covering such as is usually employed for shuttles, and it will be understood that the entire head is constituted in one piece.

In the usual form of shuttle it is conventional to anchor the guide vanes to some form of base and to secure such base to the head. According to the present invention, as will be evident from Figure 1, the guide vanes 12 are secured directly to the head 10 by causing their butt ends 13 to pierce the resilient body of the head and be anchored in the solid interior portion or core 11. The rubber body is of such nature as to inherently resist withdrawal of the vane ends 13, but it will of course be understood that the ends of the shafts may be cemented to the rubber material interiorly of the head.

As conventionally, the guide vanes 12 may take the form of a series of feathers assembled circularly as a ring in spaced relation with each other and secured to the upper end of the head 10 in the manner just described. Preferably the guide vanes will form a hollow cone with converging lower ends which may be embedded in the head as shown in Figure 2.

In view of the resilient character of the head provision is made to reinforce the shafts of the guide vanes 12 at a point above the head, the arrangement being such as to strengthen the guide vanes and secure the individual vanes in proper spaced relation with each other. For such purpose I provide a light disc 14 of thin fiberboard or similar durable material which will be of diameter and so located as to engage the shafts of the vanes 12 about midway between their ends. The exact position of the disc 14 is not material, but it should be pointed out that to keep down weight in the vane area so as to avoid throwing the device off balance and to prevent any retarding effect of the disc during flight the disc or element 14 should be as small in size as is compatible with a rigid construction.

The reinforcing disc 14 may take any of the forms shown in Figures 3, 4 and 5. In the form of Figure 3 the periphery of the disc is provided with a series of spaced recesses 15 each adapted to receive the shaft of one of the vanes. Cement will usually be employed to anchor the shafts in the recesses and provide a substantially rigid construction for the vane assembly so that the tufted upper ends 16 of the vanes will be maintained in the position as indicated in Figure 1.

The disc of Figure 4 is provided with a series of apertures 17 adjacent the periphery of the disc through which the shafts of the vanes 12 will be inserted prior to anchoring the lower ends of the shafts in the head 10. The form shown in Figure 5 is quite similar to that of Figure 4 except for the fact that the circular apertures 18 are broken away at the peripheral edge of the disc to enable the shafts of vanes 12 to be inserted laterally with somewhat of a snap action. While not essential, it is desirable to cement the shafts in the apertures of the discs of Figures 4 and 5 just as in the case of the form of disc of Figure 3 with a view of providing a substantially rigid overall construction in the vane asssembly and at the same time make it practically impossible for the ends of the vane shafts to be accidentally loosened and pulled out of the head 10.

From the description given it will be evident that I have provided a simple form of shuttle which may be manufactured without any complicated apparatus and without the need for skilled workers. The proposed device has all the advantages over the more complicated forms of shuttles now known to the art and where desired can be made much lighter and more lively in character. The parts are all of light weight but are so assembled as to constitute a rigid whole capable of withstanding hard usage.

I claim:

1. A game shuttle comprising a head, a disc spaced above the head, a circular series of guide vanes arranged about the disc and having a securing connection therewith so as to be held rigid and in properly spaced relation, the lower ends of the guide vanes being secured to the head.

2. A game shuttle comprising a head, a circular series of guide vanes anchored to the head, and a thin reinforcing disc positioned above the head within the space between the vanes and engaging and supporting said vanes at its periphery.

3. A game shuttle comprising a head, a series of guide vanes arranged circularly about the upper end of the head and secured thereto, a reinforcing disc spaced above the head, and a circularly arranged series of openings formed in the disc to receive the shanks of the guide vanes.

4. A game shuttle comprising a head, a disc spaced above the head provided at its periphery with a series of sockets, and a circularly arranged series of guide vanes extending through the sockets and cemented to the disc, the vanes being secured at their lower end to the head.

5. A game shuttle comprising a head, a circular series of guide vanes secured to the upper end of the head, and a disc spaced above the head provided with a circular series of apertures extending adjacent the periphery of the disc, the shanks of the guide vanes being cemented in said apertures.

6. A game shuttle comprising a head, a circular series of guide vanes secured to the upper end of the head, and reinforcing means for the guide vanes comprising a thin disc adapted to be positioned within the space between the ring of guide vanes and having a series of circular apertures extending adjacent its periphery to receive the shanks of the guide vanes, the material of the disc between the periphery and the apertures being ruptured to allow the vane shanks to be inserted in said apertures.

7. A game shuttle comprising a resilient head, a conically arranged series of guide vanes having upper feathered portions and having lower ends converging towards each other and embedded in the head, and a reinforcing disc spaced above the head securing the guide vanes against movement relative to each other and also against movement relative to the head.

8. A game shuttle comprising a head, a conically arranged series of guide vanes having upper feathered portions, and having lower ends secured to the upper part of the head, and a reinforcing disc element having a series of peripheral sockets in each of which is secured one of the series of guide vanes, said disc being positioned a short distance above the head and engaging the guide vanes at a point below that feathered upper portions.

JOHN T. McNAMARA.